Figure 1:
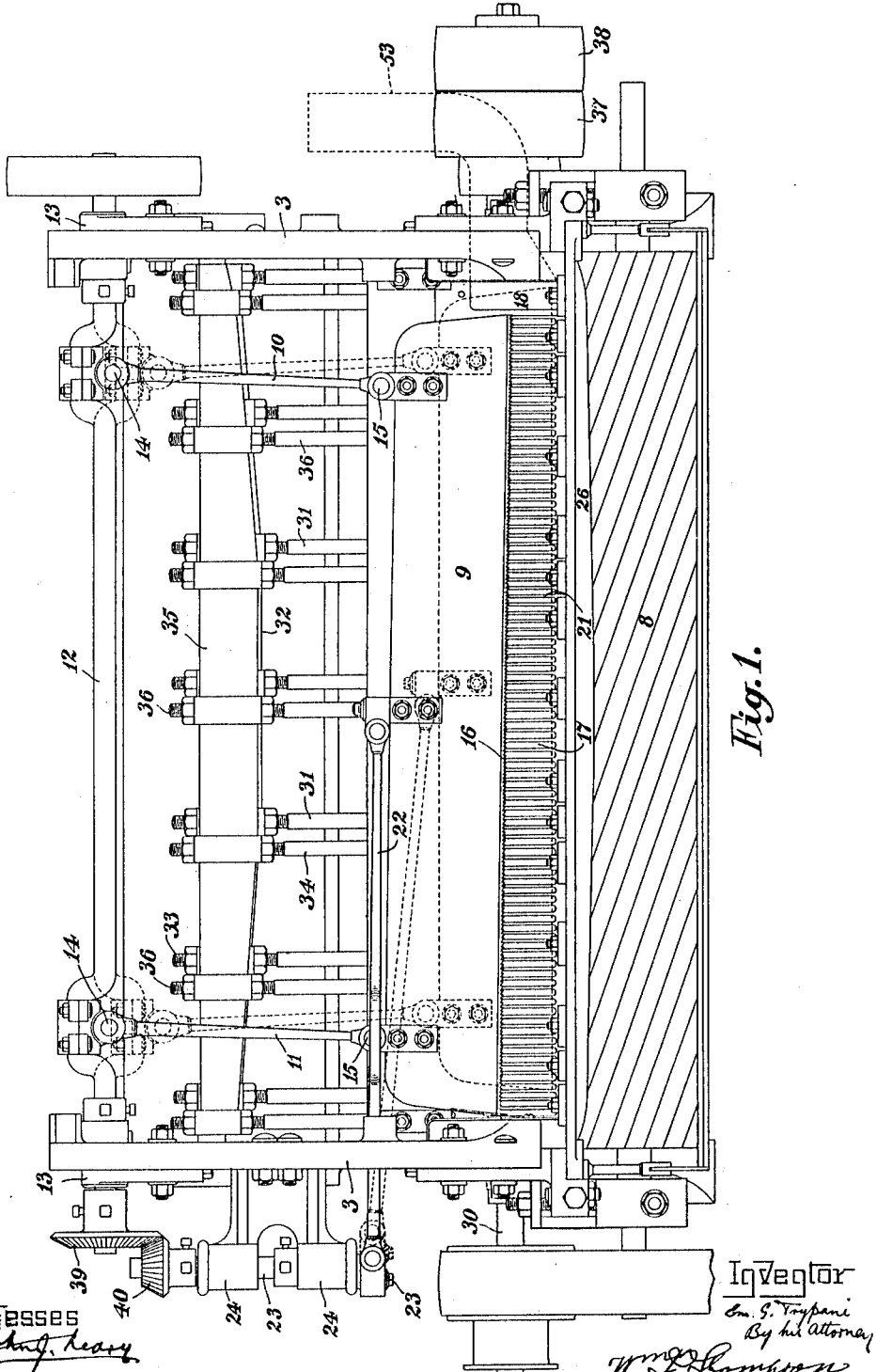

E. G. TRYPANI.
APPARATUS FOR GINNING OR TREATING COTTON AND OTHER FIBERS.
APPLICATION FILED DEC. 9, 1913.

1,118,453.

Patented Nov. 24, 1914.
5 SHEETS—SHEET 2.

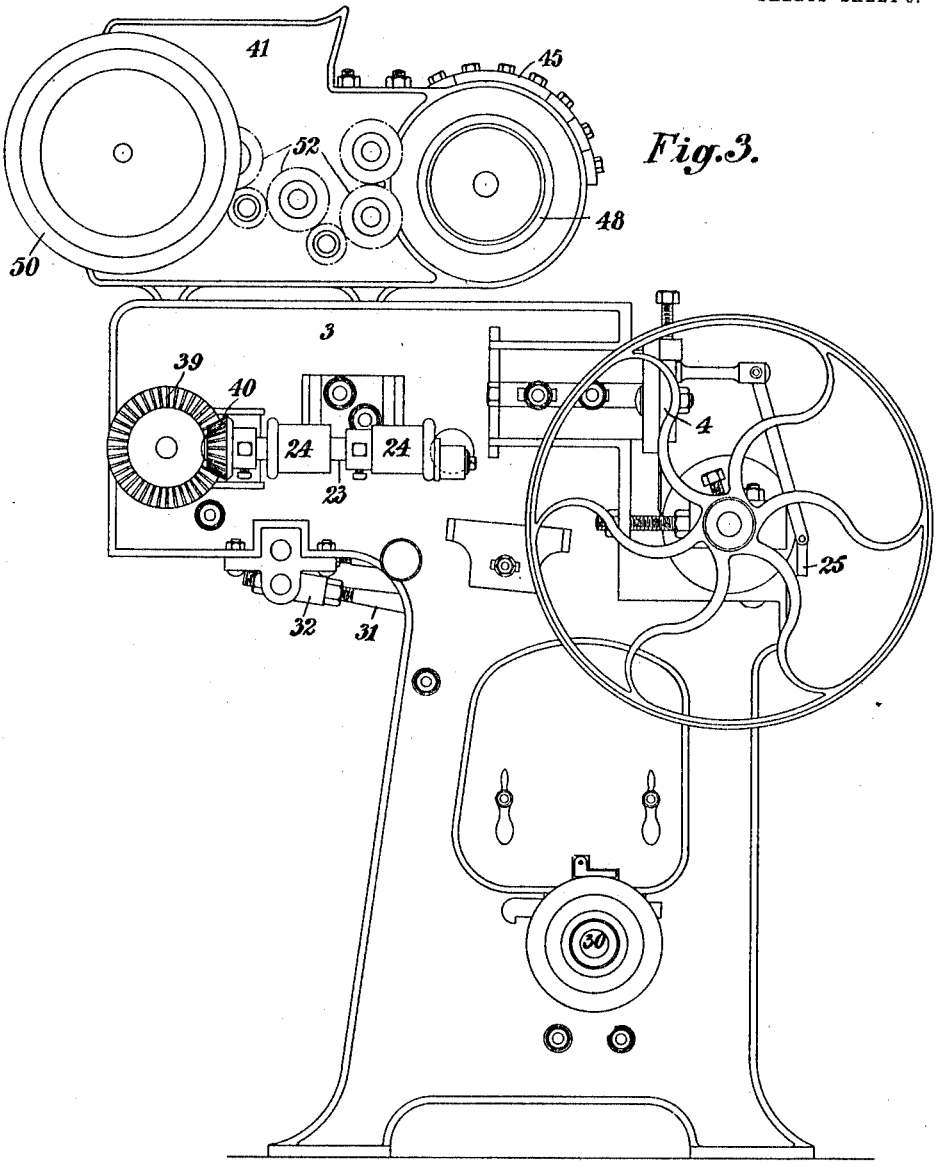

E. G. TRYPANI.
APPARATUS FOR GINNING OR TREATING COTTON AND OTHER FIBERS.
APPLICATION FILED DEC. 9, 1913.
1,118,453.
Patented Nov. 24, 1914.
5 SHEETS—SHEET 4.
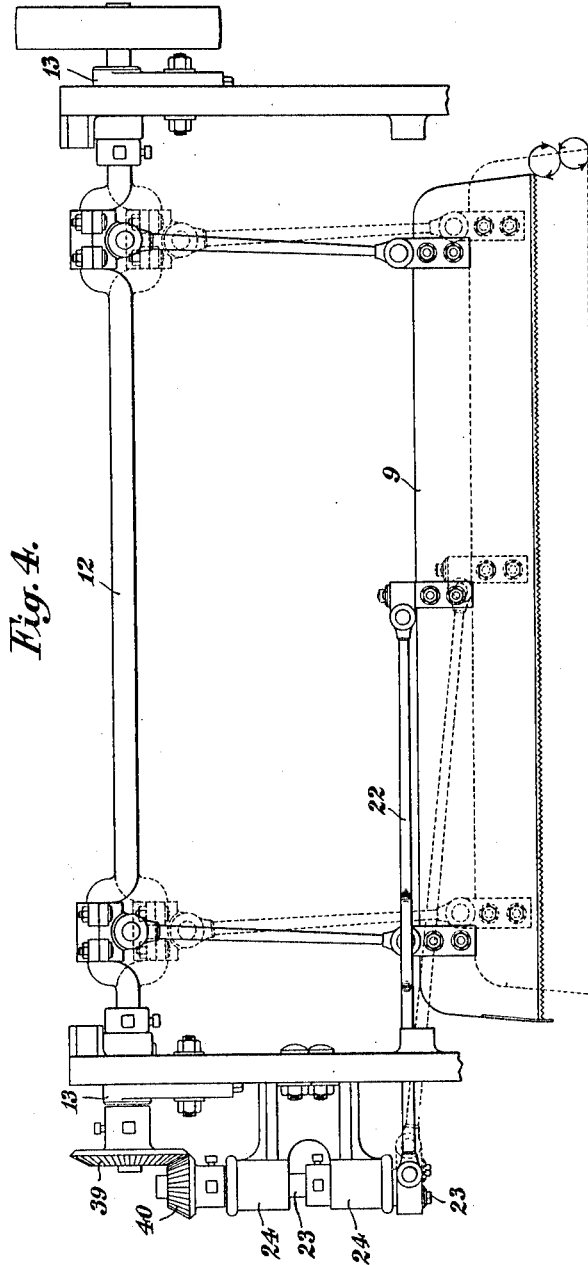
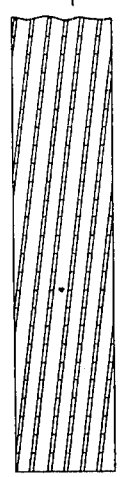
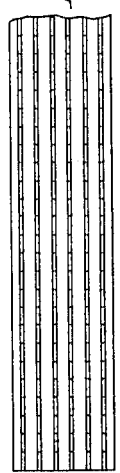
Witnesses
Inventor

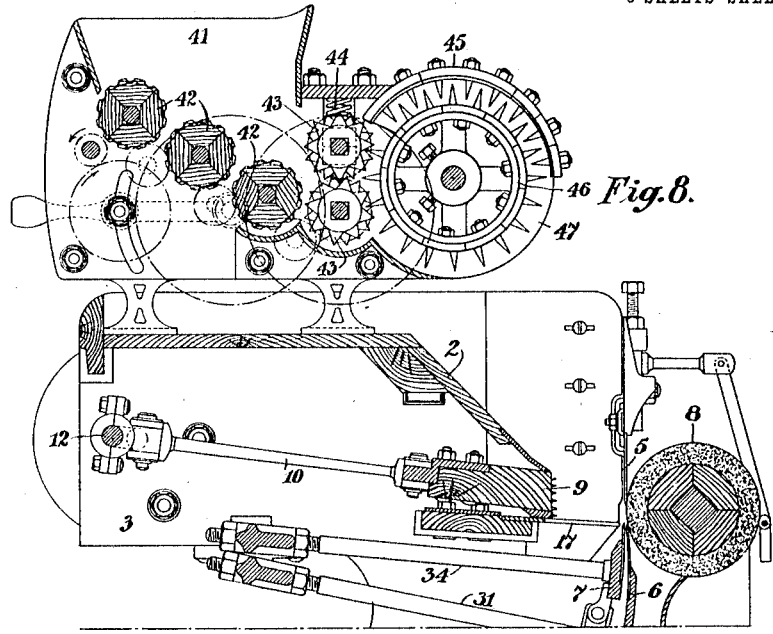

UNITED STATES PATENT OFFICE.

EMMANUEL GEORGES TRYPANI, OF LIVERPOOL, ENGLAND.

APPARATUS FOR GINNING OR TREATING COTTON AND OTHER FIBERS.

1,118,453.  Specification of Letters Patent.  Patented Nov. 24, 1914.

Application filed December 9, 1913. Serial No. 805,550.

*To all whom it may concern:*

Be it known that I, EMMANUEL GEORGES TRYPANI, a subject of the King of Greece, residing at Liverpool, in the county of Lancaster, in the Kingdom of England, and Adana, Asiatic Turkey, have invented certain new and useful Improvements in or Relating to Apparatus for Ginning or Treating Cotton and other Fibers, of which the following is a specification.

This invention relates to machines for the treatment of cotton or other fibers gathered in pods, and to the ginning thereof, also for cleaning and separating cotton, lint, and other fibers from seed which are gathered loose and not in pods.

The machine is of the type having a roller or drawing cylinder provided with a rough surface of leather or hide to seize and draw the cotton, blades coöperating with the roller, a fixed grid through which the stripped seeds fall, and a feeder bar above the grid for pressing the fiber-covered seeds up to the roller. This feeder bar has heretofore had only a reciprocating motion imparted to it toward and away from the roller, in order to feed the cotton to the point of contact between the blades and the roller. Now according to the present invention, pods of ordinary hardness, containing the cotton-covered seeds, are delivered to one end of the hopper of the improved gin, and the feeder bar has imparted to it not only a reciprocating motion toward and away from the drawing roller, but also an endwise motion to right and left. This two-fold action has the effect of breaking the pods and liberating the fiber-covered seed inside, also shaking the seeds and broken pieces of pod as the lint is drawn away by the roller, so as to give greater facility for the stripped seeds to drop through the grid, and the broken pieces of pod to be delivered through an escape aperture at the end of the grid. A further object of this endwise reciprocation, is to distribute some of the unstripped seeds along the roller, so as to prevent too great an accumulation of seed, all at one place. Hence the field of action of the roller and blades is spread over a larger area, and so enables a greater quantity of cotton or other fiber to be cleaned or separated, than is possible in roller gins of the type referred to as heretofore constructed. In cases where the seed cotton is gathered loose and not in pods, then it is fed into the hopper, the whole length of same, and the escape aperture at the end of the grid is unnecessary. In cases where the pods in which the cotton or other fiber is gathered are hard, then in such case I provide in connection with the gin an apparatus for breaking or opening the pods so as to liberate the fiber-covered seeds inside, and the seed cotton and broken pieces of pod are delivered automatically into the hopper at one end of same, such apparatus being described and shown in my application Serial No. 821,327, filed February 26, 1914, the same being a division of this application. In either case an effectual stripping of the cotton or other fiber from the seeds is effected, the liberated fiber is gathered beneath the fixed knife by the usual roller and deposited on the floor outside the machine, while the stripped seeds are separately ejected through the grid, and the broken pods (when these are fed into the hopper) are ejected at the end of the grid. In cases where the seed cotton or other fiber is gathered loose and not in pods, or when the seed cotton has been removed from the pods, or when the pods are of ordinary hardness, the device for breaking and opening the pods is omitted.

The invention will be understood from the following description, reference being had to the accompanying drawings, in which a decorticator and gin complete is illustrated.

Figure 2:
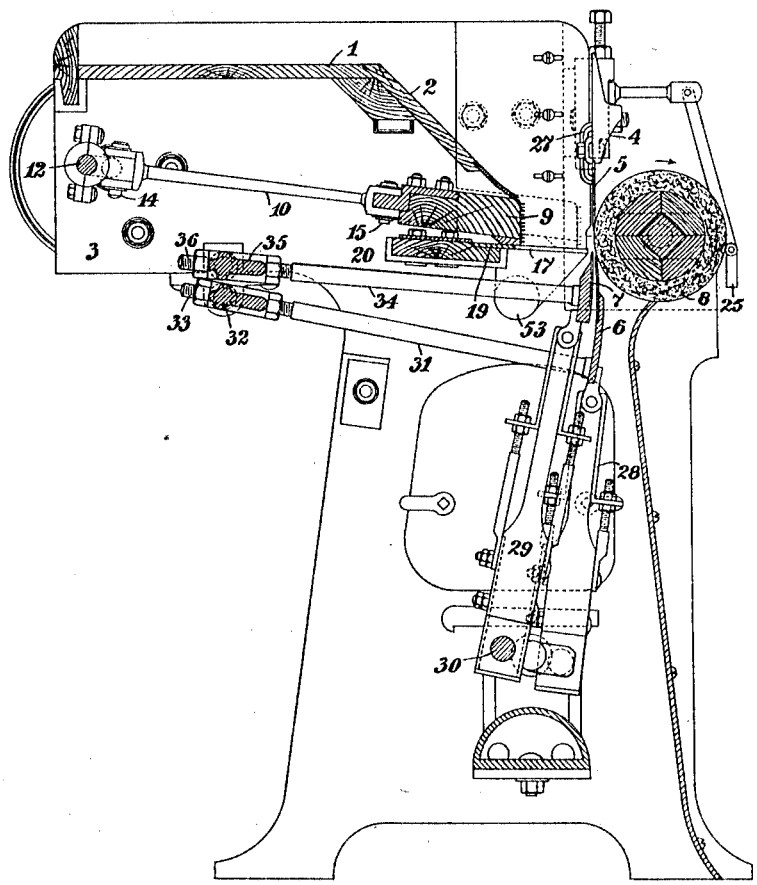

Figure 1 is a plan view of my improved cotton gin for treating cotton or other fibers when gathered in pods; Fig. 2, a transverse vertical section; and Fig. 3, an end elevation thereof; Fig. 4 is a plan view of part of the machine showing the modification that is made when the cotton is loose and not in pods; Figs. 5 and 6 are front views of the teeth mounted on the front of the feeder bar; Fig. 7 is a side view thereof; Fig. 8 is a vertical cross section of the decorticator, and a portion of the gin hopper; and Fig. 9 is a plan view of the decorticator with certain parts removed.

Referring to Figs. 1–7 of these drawings, 1 is a feed table and 2 a sloping portion, which together with the end frames 3 of the machine, the rail 4 and fixed blade or knife 5, form the hopper into which the pods containing the fiber covered seeds or the loose fiber covered seeds are fed by hand. 6 and 7 are the two usual reciprocating blades or knives which work in conjunction with the fixed blade 5 and extend the full length of the hopper. 8 is the usual roller covered with leather or other suitable material employed in conjunction with and extending the full length of the reciprocating blades 6 and 7 and fixed blade 5. At the bottom of the hopper is the feeder bar 9 which extends throughout the length of the blades or knives 5, 6, and 7, and is secured to connecting rods 10 and 11 to which the usual reciprocating motion toward and away from the drawing roller is imparted by the revolving crank shaft 12 journaled in suitable bearings 13 secured to the end frames of the machine. These connecting rods 10 and 11 are jointed by pivot pins 14 and 15 to enable the feeder bar to have imparted to it a lengthwise or endwise motion as well as the motion toward and away from the roller 8. The front of this feeder bar is clothed with rows of short teeth 16 which all point in one direction, the object of which will be presently described. Beneath the space which is traversed by the feeder bar 9 is placed the fixed grid or grating 17, so that the seeds from which the cotton fibers have been removed may fall through this fixed grid or grating, while one end 18 of the grid is left open so that the broken pieces of the pods can escape at that end. This fixed grid is formed by cutting out slots 21 in a plate 19 supported on the cross bar 20 and thus constituting a grating, and these spaces 21 are of such size as may be appropriate to the size of the seeds in the cotton, upon which the gin is intended to operate. The feeder bar 9 which at the front end rests on this grating, is as usual caused to move alternately toward and away from the roller 8, and thus the cotton fed into the said hopper is pushed against the roller 8, but unlike known machines the feeder bar has imparted to it a longitudinal or endwise motion or vibration by being secured to a connecting rod 22 to which a reciprocating motion is imparted by the revolving crank shaft 23 journaled in bearings 24 secured to the side frame 3, the pivot pins 14 and 15 allowing this endwise movement as hereinbefore mentioned. The alternate moving of the feeder bar 9 clothed with teeth 16 at front, toward and away from the roller 8 and its endwise movement in the direction of its length has the effect of breaking the pods and liberating the fiber covered seeds inside, also pushes the fiber covered seeds against the roller 8 which revolves in the direction indicated by the arrow, feeds them along the grid so as to prevent a too great accumulation of seed cotton at one place on the roller, and shakes the seeds and broken pieces of pod so as to give greater facility for the stripped seeds to drop through the grid, and the broken pieces of pod to escape at the open end of the grid into the delivery chute 53. The fibers of cotton becoming engaged with the leather or other covering of the roller, are drawn between the fixed blade or knife 5 and the roller 8, and simultaneously the reciprocating blades or knives 6 and 7 which ascend or descend alternately (there being always one or the other ascending) striking the seeds also cause them to be separated from the fibers of cotton which are being drawn along by the roller 8 but the stripped seeds and broken pieces of pod are stopped by the fixed blade. The liberated fibers of cotton gathering on the surface of the roller, are carried beneath the fixed blade or knife 5 by the roller 8, and are discharged by the doffing device 25 ready for the press. The seeds however which are not properly stripped of their cotton, are retained on the grid until sufficiently stripped to pass through the grid. The throw of the crank at the end of the crank shaft 12 operating the connecting rod 11, is by preference rather longer than the other crank operating the connecting rod 10, so that the advancing and retreating stroke of the feeder bar is rather longer at one end than the other. The object of this is to give more space in the hopper at the end where the pods are fed in, when the feeder bar is drawn back transversely, than at the other end (as shown by the full lines Fig. 1), and yet bring the face of the feeder bar at both ends parallel with the drawing roller when moved transversely forward (as shown by the dotted lines Fig. 1). The connecting rod 11 is made correspondingly shorter than the connecting rod 10, in order to make up the difference in the throw of the cranks, so as to enable the front of the feeder bar to lie parallel with the roller when the feeder bar is in its forward position. This arrangement is specially useful when the cotton is fed into the gin in pods. When however loose cotton is fed into the gin, the cranks are preferably of equal throw, and the connecting rods are of equal length as shown in Fig. 4. In cases where the pods as well as the seed have to be treated by the machine, I make the teeth 16 slanting, as shown in Fig. 1, but when loose cotton and not the pods is to be treated these teeth 16 which project from the front of the feeder bar are pyramidal, that is inclined toward a central apex.

The other constructional details of the gin do not materially differ from known machines of the roller type. The fixed blade or knife 5 is secured by clamps 26 to the rails 4 and is pressed against the face of the roller by adjustable springs 27. The reciprocating blades or knives 6 and 7 receive motion by means of connecting rods 28 and 29 from the cranks on a crank shaft 30. The reciprocating blade or knife 6 is connected to a suitable number of radius rods 31 which pass through a shaft 32 extending lengthwise of the machine and capable of being oscillated in bearings in the side frames 3 of the machine. The radius rods are provided with screw threads and nuts 33 so that the distance of the reciprocating blade or knife from the axis of the shaft 32 may be adjusted as may be necessary. The reciprocating blade or knife 7 is also connected to a similar number of radius rods 34 which pass through a shaft 35 extending lengthwise of the machine and capable of being oscillated in bearings formed in the side frame 3 of the machine. Screw threads and nuts 36 are provided similar to threads and nuts 33 already described.

In cases where the pods in which the cotton or other fiber is gathered, are hard, then in such case I provide in connection with the feeding hopper of the gin, a decorticator (shown in Figs. 8 and 9) by which the pods are first decorticated or broken, so as to liberate the fiber covered seeds inside. In this case the cotton pods are fed into the hopper 41 of a decorticator containing a row of three fluted parallel feed rolls of wood 42 which are geared together at 52 so as to all revolve in the same direction, and are adapted to feed the pods between the toothed rollers 43, which are pressed toward one another by the spring 44. These open or break the pods and expose the fiber covered seeds inside. These toothed rollers 43 deliver the broken pods and fiber covered seeds into the stationary casing 45 provided with internal teeth or spikes, and within this casing there is mounted co-axially a revolving toothed or spiked roll 46, which picks and tends to separate the seed cotton from the opened pods. The spikes on the roller 46 pass between the spikes on the casing 45. The decorticator stands on the table 1 carried by the end frames 3 of the machine, and the broken pods and fiber covered seeds, are discharged from the casing through the delivery opening 47 in the casing on to the sloping portion 2 of the gin hopper. The said decorticator is preferably about one-third length of the gin hopper, and is placed on the table 1 so as to deliver on to the sloping board 2 near one end thereof.

The machine is driven by a single prime mover such as the driving pulley 37 which together with a loose pulley 38 is mounted on the driving shaft 30 journaled in suitable bearings. This shaft gives rotation by a belt to the crank shaft 12, and so imparts the advancing and retreating movement of the feeder bar 9. By means of the bevel gear 39, 40, or other suitable device, this crank shaft also gives rotation to the crank shaft 23 by which the endwise motion of the feeder bar is obtained. The bevel gear is in such ratio that the feeder bar makes more endwise reciprocations than transverse reciprocations and this ratio can be altered or regulated so as to give the feeder bar the speed and movement required best suited to the cotton being treated. The figure described by any given point on the feeder bar 9 when such feeder-bar makes two endwise reciprocations, for each backward and forward reciprocation from and to the roller 8, is substantially that of an 8, as shown by way of example by the dotted lines 55 in Fig. 4. It should be noted, however, that, in order to produce this movement, the crank on the crank-shaft 23 should be at mid-stroke when the cranks on the shaft 12 are at the completion of their stroke. Figs. 1 and 4 of the drawings show the crank on the shaft 23 at the completion of its stroke instead of at mid-stroke, the only object of drawing it in this way being to indicate in the clearest way possible, the actual stroke of the crank and the preferred stroke of the feeder bar endwise. Of course, the figure 55 described is different when the ratio of the bevel gears 39 and 40 is changed. The shaft 30 by means of the cranks drives the blades or knives 6 and 7. It also drives by means of a belt the pulley 48 of the spiked roll 46, and the speed pulley 49 drives the pulley 50 which operates the feed rolls 42 and the breaking rolls 43. By means of belt gear, shaft 30 also drives the roller 8.

The operation of the machine may be briefly summarized as follows:—The pods of ordinary hardness are fed by hand on to the sloping board, and slide down it into the hopper at one end thereof or the apparatus for separating the fiber-covered seeds from the pods in which they grow may be used, which feeds the broken pods and cotton automatically into the hopper. The feeder bar at once pushes the fiber covered seeds and (or) pods against the roller 8, and the fibers of cotton becoming engaged with the leather or other covering of the revolving roller 8, are drawn between the fixed blade 5, and the roller, and simultaneously the reciprocating blades striking the seeds cause them to be separated from the fibers of cotton which are being drawn along by the roller. Those seeds which escape this operation, are acted on by means of the endwise movement of the feeder bar, which moves the seeds longitudinally along the grid to another part of the roller 8 and blade 5, and pushes the seeds against the roller farther on along its length. This facilitates the feeding of the cotton and the seeds from which the cotton has not been sufficiently removed to another part of the roller and blades, and prevents the accumulation of such seeds all at one place. Consequently the field of action of the roller and blades is spread over a larger area, thus affording better access for the cotton to the roller, which greatly increases the efficiency of the machine and furthermore the shaking or endwise motion of the feeder bar shakes the stripped seeds and broken pieces of pod, so that their escape through the fixed grid, and through the opening at the end of the grid respectively, is facilitated. The teeth if set at an obliquity (Fig. 1) relative the front edge of the feeder bar, seize some of the cotton when the feeder bar moves endwise in one direction, and drag it longitudinally along the grid, but when moved back in the other direction give up their cotton and permit it to remain in the grid at the place to which it has been dragged. These teeth may be arranged in horizontal rows (Fig. 6) on the front of the feeder bar, or in oblique rows (Fig. 5) so as to tend to drag the cotton down toward the bottom of the fixed blade 5. In cases where the seed cotton has been freed from the pods, then the seed cotton is fed by hand into the hopper the whole length of the same, and the function of the endwise shaking movement of the feeder bar, is to afford better access for the cotton to get to the roller, and to shake the stripped seeds through the grid.

The invention can be applied to all roller gins of usual and suitable construction, such as the gin known as the Macarthy gin, the Osgood gin and other roller cotton gins, and also to other machinery for carrying fibers. The application of my invention to roller gins, by retaining the seeds on the grid until sufficiently stripped, and by facilitating the escape from the machine of the stripped seeds and broken pieces of pod which have been removed from the fiber, enables a greater quantity of cotton to be cleaned or stripped than has been possible hitherto.

I declare that what I claim is:—

1. In a roller gin, the combination of a hopper; a blade at one side thereof; a drawing roller located adjacent to the blade; a feeder bar; and means for imparting motion to said bar toward and from the roller, and also an endwise vibratory motion thereto.

2. In a roller gin, the combination with a hopper receptacle, a blade at one side thereof, and a drawing roller adjacent to the blade, of a feeder bar which has imparted to it an endwise reciprocation, and a transverse reciprocation toward and away from the roller, and means by which the number of endwise reciprocations are greater than the transverse reciprocations.

3. In a roller gin, the combination with a hopper receptacle, a blade at one side thereof, a drawing roller adjacent to the blade, and a grid at the bottom of the hopper, of a feeder bar having an endwise movement imparted to it as well as an advancing and retreating motion, and wire teeth fixed to the front edge of the feeder bar for the purpose of moving the seeds and broken pods longitudinally along the grid to another part of the roller and blade so as to prevent a too great accumulation of cotton at one place, and given greater facility for the stripped seeds to escape at the grid, and the broken pods through the end of the grid.

4. In a roller gin, the combination with a hopper receptacle, fixed and movable blades at one side of the hopper, and a drawing roller adjacent to the blades, of a feeder bar having endwise and advancing and retreating motions imparted to it, and wire teeth fixed to the front edge of the feeder bar such teeth being arranged in oblique rows so as to tend to drag the cotton down toward the bottom of the fixed blade.

5. In a roller gin, the combination with a hopper, a drawing roller, and blades located adjacent to said roller; of a feeder bar mounted in the hopper and susceptible of endwise and transverse motion toward and from the roller; and a crank and connecting rod near each end of the feeder bar for imparting transverse motion thereto, one of said cranks having a longer throw than the other, and the connecting rod coöperating with said crank being correspondingly shorter than the other connecting rod, whereby said bar, when drawn back, will lie farther away from the roller at one end than at the other, and when advanced will lie parallel with the roller.

6. In a roller gin, the combination with a hopper, a drawing roller, and blades adjacent to the roller; of a feeder bar located in the hopper; a crank shaft; and connecting rods pivotally connected to the feeder bar and to said shaft, whereby the feeder bar will be moved toward and from the roller and may also be moved endwise.

7. In combination, the hopper receptacle, the feeder bar at the bottom thereof, means for imparting thereto a forward and retreating motion toward and away from the roller of the gin, and means for imparting an endwise motion to the said feeder bar.

8. In combination, the hopper receptacle, a fixed blade at one side thereof, the feeder bar at the bottom of the hopper, a revolving shaft outside the hopper, long and short throw cranks on the shaft, and connecting rods of different lengths for bringing the feeder bar parallel with the blade when in the forward position, but drawing it back at one end farther than the other when in the rearward position.

9. In a roller gin, the combination with a hopper, fixed and movable blades at one side of the hopper, and a drawing roller adjacent to the blades; of a feeder bar; means for moving said bar toward and from the roller; a revolving crank journaled in the gin frame; a connecting rod extending from said crank to the bar, for imparting endwise movement to said bar; and gear wheels for imparting rotation to the crank, said wheels being changeable, so that the ratio between the endwise reciprocation of the feeder bar and the transverse movement toward and from the roller may be altered or regulated to give such feeder bar the speed and movement best suited to the cotton to be treated.

In witness whereof, I have hereunto signed my name this 20 day of Nov. 1913, in the presence of two subscribing witnesses.

EMMANUEL GEORGES TRYPANI.

Witnesses:
EDWARD ROBERTS,
G. C. DYMOND.

Copies of this patent may be obtained for five cents each, by addressing the "Commissioner of Patents. Washington, D. C."